United States Patent [19]

Cozine et al.

[11] Patent Number: 4,924,944
[45] Date of Patent: May 15, 1990

[54] SIDE-EJECTING, DOUBLE CORING TINE

[76] Inventors: Mark L. Cozine, 5301 S. Coddington Ave., Lincoln, Nebr. 68523; Norval L. Papke, Jr., R.R. 1, Box 193, Cortland, Nebr. 68331; Loren F. Hansen, 1629 N. 73rd St., Lincoln, Nebr. 68505

[21] Appl. No.: 320,464

[22] Filed: Mar. 8, 1989

[51] Int. Cl.⁵ .............................. A01B 45/02
[52] U.S. Cl. .................... 172/22; 294/50.7
[58] Field of Search ............. 172/22, 21, 554, 556, 172/101; 264/50.7, 51.3

[56] References Cited

U.S. PATENT DOCUMENTS

| | | | |
|---|---|---|---|
| 2,057,142 | 10/1936 | Fry | 172/22 |
| 2,638,043 | 5/1953 | Ferguson et al. | 172/22 |
| 2,638,831 | 5/1953 | Ferguson | 172/22 |
| 3,011,563 | 12/1961 | Ceretti | 294/50.7 X |
| 3,171,498 | 3/1965 | Logan | 172/22 |

FOREIGN PATENT DOCUMENTS 1443317  7/1976  United Kingdom ............... 172/22

Primary Examiner—Richard J. Johnson
Attorney, Agent, or Firm—Welsh & Katz, Ltd.

[57] ABSTRACT

A side-ejecting double coring tine includes a pair of vertically depending tine members, each having an upper end portion with a generally rectangular cross-section, a central body portion and a lower end portion having a generally circular cross-section, the central body portion having one side open for the ejection of cores therefrom, the rectangular configuration of the upper end portion providing attachment points for a crosspiece which provides additional structural rigidity to the assembly.

3 Claims, 2 Drawing Sheets

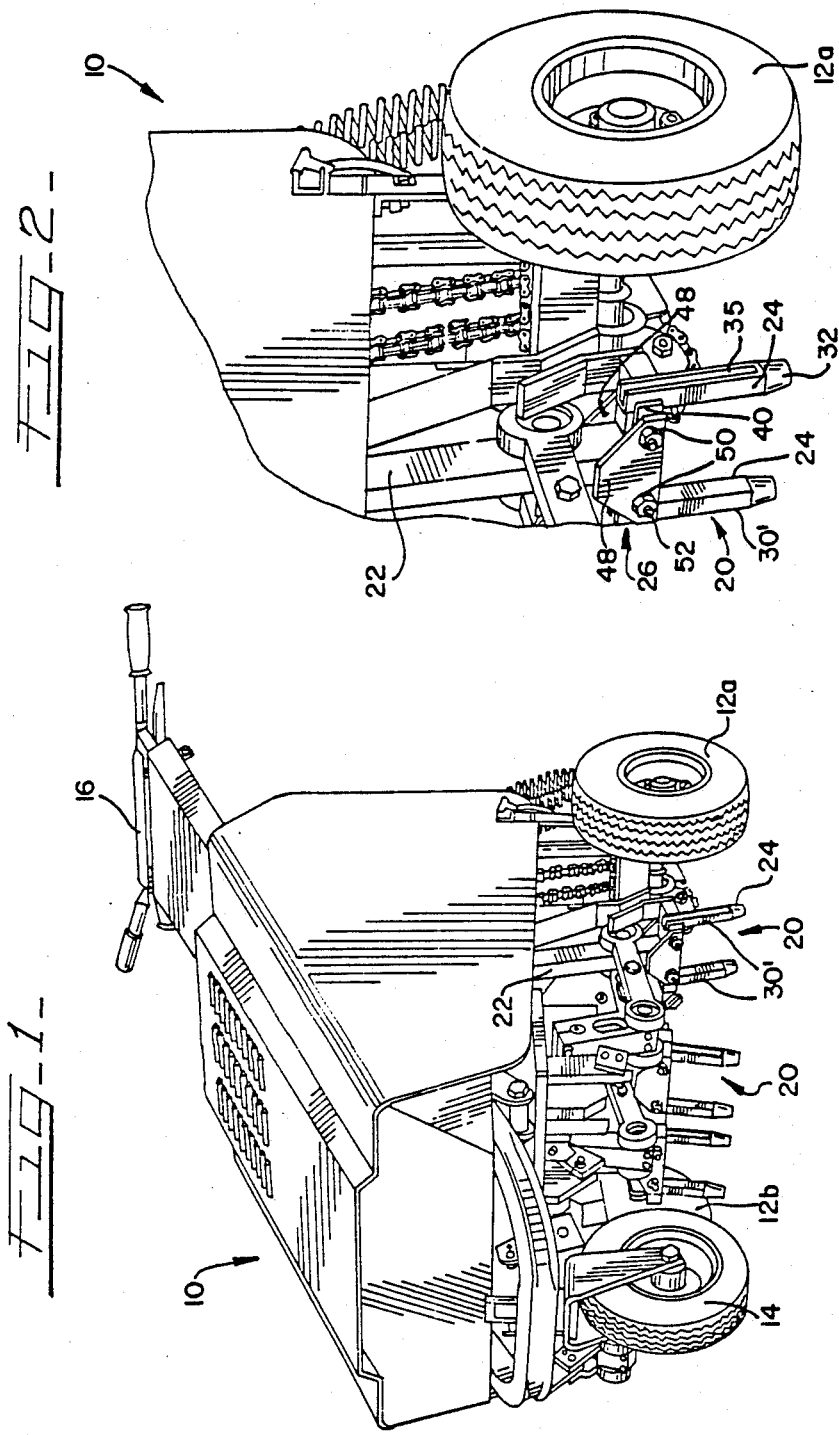

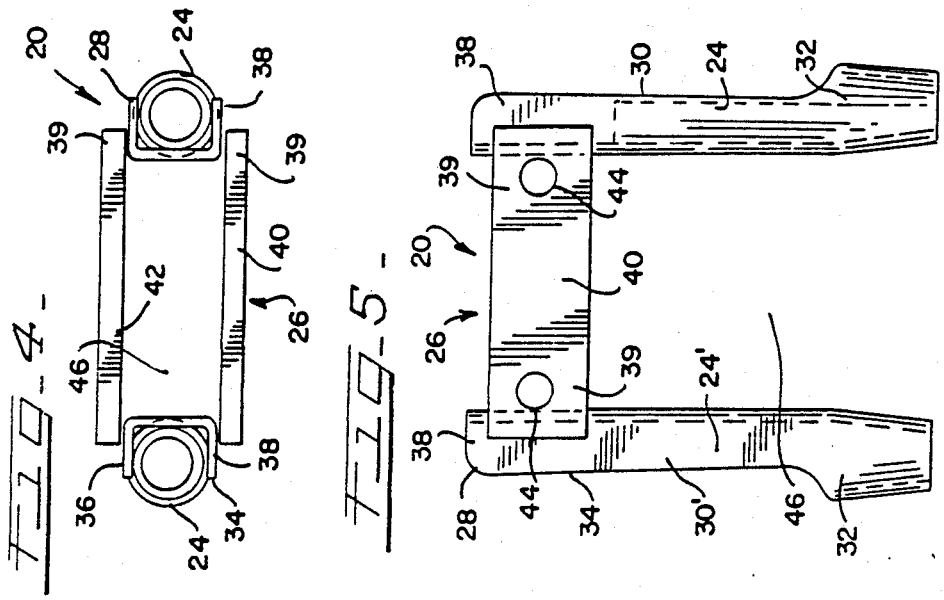
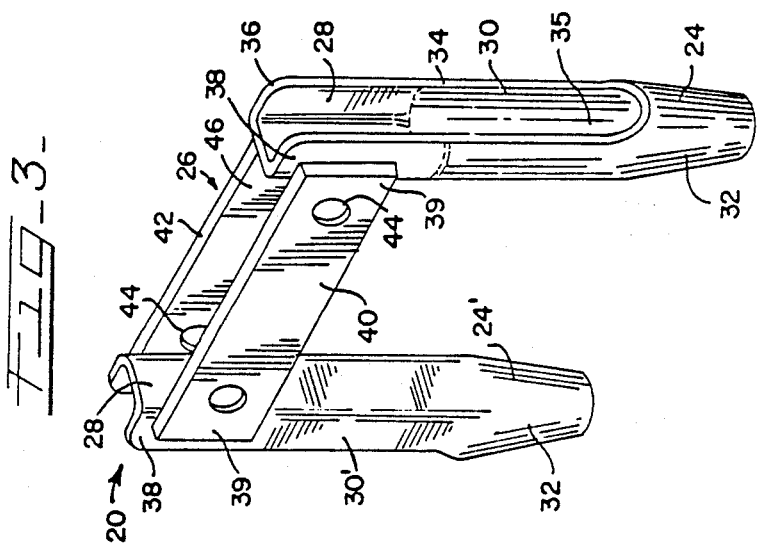

SIDE-EJECTING, DOUBLE CORING TINE

BACKGROUND OF THE INVENTION

The present invention relates to turf aerating devices having reciprocating or rolling aerating tines for withdrawing turf cores, and specifically relates to a side-ejecting tine for such a device.

Conventional turf aerators are provided in either a reciprocating or rolling format, the former where a plurality of vertically depending tines are linearly arrayed for reciprocating vertical action in and out of the turf. The rolling type of turf aerator involves a generally horizontal reel assembly from which a plurality of tines extend radially to be projected into the turf upon axial rotation of the reel. Both types of turf aerators are used for aerating or ventilating turf such as the greens of golf courses, lawns and the like.

Aerator tines commonly have a generally tubular shape with a tapered hollow point designed so that a portion of turf and soil enters the bottom of the tine and is ejected through the top of the tine, either through its own frangible nature or as a subsequent core or portion of soil enters at the bottom. A common problem with such tines, especially when used in sticky clay soils, is that the soil core tends to stick to the inside of the tine, clogging the tine so that no soil can eject through the top. This clogging greatly impedes the efficiency of the aerating device.

One attempted solution to this problem of tine clogging is to open up one side of the tine beginning from a short distance above the tine bottom, so that the core may readily escape therefrom. In such open-sided tines, it is preferable to have an opening at least as long as the core of soil that is being removed, and preferably longer, for easy core ejection from the tine. U.S. Pat. No. 2,638,043 discloses a core aerating machine having a plurality of vertically depending tines, the tines being open on one side thereof and having a flattened upper portion adapted to be secured to a horizontal bracket on the device. However, a significant drawback to such a design is that when open-sided tines of this type are mounted to the aerator itself, and the mounting bracket is located above the side-ejecting opening, the tine is rendered long and weak, and susceptible to breakage when used in hard ground or when the tines encounter tree roots.

Thus, there is a need for a core aerating tine which has sufficient structural rigidity to be used in hard or clayey ground and where tree roots are present, and which ejects cores in a manner which does not clog or otherwise interfere with the operation of the machine.

SUMMARY OF THE INVENTION

Accordingly, a side-ejecting double coring tine is provided and preferably includes a pair of coring tine members, each tine member having a lower end portion with a generally circular cross-section, an elongate central body portion having one side open, and an upper end portion being generally rectangular or "U"-shaped in cross-section. At least a portion of the central body portion may also be rectangular or 'U'-shaped in cross-section. The upper end portion is provided with at least two parallel side faces which facilitate the attachment of a crosspiece thereto. The crosspiece may be welded or otherwise fixed to each of the tine members to retain them in spaced parallel relationship to each other. When assembled, a rigid coring unit is provided, as each tine member retains its inherent tubular rigidity. The tine members are preferably mounted to the crosspiece so that the open side-ejecting portions face laterally outward.

BRIEF DESCRIPTION OF THE DRAWINGS

FIG. 1 is a front perspective elevational view of a reciprocating turf aerator incorporating the tine of the invention;

FIG. 2 is a fragmentary perspective elevational view of the aerator depicted in FIG. 1;

FIG. 3 is a front perspective elevational view of the tine of the invention;

FIG. 4 is an overhead plan view of the tine of FIG. 3 and

FIG. 5 is a front elevational view of the tine of FIG. 3.

DESCRIPTION OF THE PREFERRED EMBODIMENT

Referring now to the drawings, and in particular to FIGS. 1 and 2, the present invention is illustrated, by way of example, on a turf aerator indicated generally at 10. The turf aerator 10 is of a generally known design which is commercially available from the Outboard Marine Corporation, although as will be apparent, the present invention may also be employed in other machines or apparatus including, but not limited to, rolling type core aerators, such as are also commercially available from the Outboard Marine Corporation.

The turf aerator 10 has turf-engaging, laterally spaced drive wheels 12a and 12b and a forward wheel 14 steerable through a suitable control handle 16 in a similar manner to a walk-behind lawn mower. The turf aerator 10 is of the generally vertically reciprocating tine type, wherein a plurality of laterally aligned, preferably tubular penetrating tines 20 are supported, respectively, on the lower ends of vertically reciprocating tine arms 22, such that upon reciprocating movement of the tine arms, the tines are caused to penetrate the turf surface and effect removal of turf cores as the aerator is caused to traverse a turf surface.

Referring now to FIGS. 3-5, the tine of the invention, designated generally 20, is seen provided with a pair of tine members 24, fabricated of hardened steel or other suitable alloy, and secured together in spaced parallel relationship to each other by a crosspiece 26. Each tine member 24 is generally tubular in construction, having an upper end portion 28 which is generally rectangular or "U"-shaped in cross-section, a central body portion 30 which is at least partially rectangular in cross-section, and a lower end portion 32 having a generally circular cross-section. It is preferred that the configuration of each tine member 24 is such that at least the upper end portion 28 is rectangular or U-shaped in cross-section, and gradually changes in cross-sectional configuration to the generally circular cross-section of the lower end portion 32. The exact proportion of rectangular-to-circular cross-section of the central body portion 30 may vary with the application, but in the preferred embodiment, this tine member 24 is provided with a rectangular cross-section which extends just below the crosspiece 26.

Alternatively, the central body portion 30' may be substantially rectangular and may become circular in cross-section mainly at the lower end portion 32, as is represented by the tine member 24'. Other equivalent proportions of cross-sectional configurations are contemplated, and although in FIGS. 3 and 5 two distinct tine members are depicted, this is for purposes of illustration, it being preferred that both tine members 24 be identical, as shown in FIGS. 1 and 2. In the preferred embodiment, the lower end portion 32 is tapered or frusto-conical in shape to facilitate penetration into the turf.

The tine members 24 are fabricated by stamping a flat piece into a generally cylindrical shape, and then reforming the upper end portion 28 and as much of the central body portion 30 as is desired into a rectangular cross-sectional shape.

The tine members 24 are of the side-ejecting type, and as such, a side 34 of the central body portion 30 is generally open to allow the unobstructed passage of cores therefrom. The open portion 35 of the side 34 is generally longer than the length of the core to allow easy ejection of the core therefrom, and in the preferred embodiment extends to the upper end 28 of the tine member 24. The upper end portion 28 of each tine member is provided with at least a pair of parallel side faces 36 and 38, which provide attachment points for ends 39 of the crosspiece 26.

The crosspiece 26 is generally provided with a pair of elongate, horizontally positioned bar members 40 and 42, each of which is provided with at least two mounting openings 44 to enable the attachment of the tine 20 to the aerator 10. The position of the parallel side faces 36 and 38 on each tine member 24 is such that the tine members 24 may be preferably secured to the crosspiece 26 and positioned relative to each other so that the open side 34 of each tine member is facing laterally outward. The outward positioning of the open side 34 allows for the mounting of the bar members 40 and 42 as low as possible on the tine members 24. Through this configuration, stress forces acting on the tine 20 as it penetrates the soil will be transmitted upwardly through the tine members 24 to decrease bending movement and to maintain tine alignment relative to the tine arm 22. In this manner, tine splaying, bending or breakage is prevented, especially when the tine 20 is used in clay soils. In addition, the fact that the tine members 24 retain a generally tubular cross-sectional configuration after fabrication inherently provides additional strength over conventional tines having flat end portions.

A further advantage of the double side-ejecting coring tine of the invention is that the crosspiece 26 may be mounted at any specified location along the central or upper body portions 30 and 28, respectively, having a rectangular or "U"-shaped cross-section. Thus, less tine breakage occurs when using the tine assembly 20 of the present invention.

Referring now to FIG. 2, the tine 20 is secured between a pair of flanges 48 attached to the base of the tine arm 22. Each flange 48 has a pair of mounting apertures 50 which correspond to the mounting openings 44 of the cross-piece 26. A threaded fastener 52 such as a bolt is passed through the openings 44 and 50 to affix the tine 20 to the arm 22. The rectangular cross-sectional configuration of the upper end 28 of each tine member 24 prevents the collapse of the tine member 24 when the fasteners 52 are tightened.

Consequently, the double coring side-ejecting tine of the invention is stronger and is less prone to clogging than conventional units, especially when used in hard or clay soils. The rectangular configuration of at least the upper end portion allows for permanent attachment to a structural crosspiece which provides additional strength and allows mounting of the tines to the aerator. The outwardly positioned open sides also facilitate core ejection and prevent the interference of ejected cores with the operation of the aerator.

While a particular embodiment of the double coring side-ejecting tine of the invention has been shown and described, it will be appreciated by those skilled in the art that changes and modifications may be made thereto without departing from the invention in its broader aspects and as set forth in the following claims.

We claim:

1. A double coring tine for use in an automatic turf aerator machine, said tine comprising:

a pair of tubular coring tine members, each of which having an upper end portion, a lower end portion and a central portion, said upper end portion being substantially rectangular in cross-section and having a pair of opposing parallel flat side faces, said lower end portion being generally circular in cross-section, and said central portion being substantially open along one vertically extending side portion thereof; and a pair of elongate mounting bars, each said bar having two ends, corresponding ends of said mounting bars being permanently secured to each of said tine members at said side faces so as to sandwich said tine members therebetween and to maintain said tine members in spaced parallel relationship to each other as an integral unit, said tine members being mounted to said mounting bars so that said open central side portions face laterally outward and opposite each other.

2. The double coring tine as defined in claim 1 wherein said central portion is at least partially rectangular in cross-section.

3. The double coring tine as defined in claim 1 wherein said lower end portion of each of said tine members is tapered.

* * * * *